(12) United States Patent
Tsunezumi (10) Patent No.: US 7,251,311 B2
(45) Date of Patent: Jul. 31, 2007

(54) SYSTEM AND PROGRAM FOR PROVIDING MEDICAL SUPPORT

(75) Inventor: Tomoko Tsunezumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 10/299,809

(22) Filed: Nov. 20, 2002

(65) Prior Publication Data

US 2003/0062989 A1    Apr. 3, 2003

Related U.S. Application Data

(63) Continuation of application No. PCT/JP02/03193, filed on Mar. 29, 2002.

(30) Foreign Application Priority Data

Mar. 30, 2001    (JP) ............................. 2001-101827

(51) Int. Cl.
*H04M 11/00* (2006.01)
(52) U.S. Cl. .................... 379/38; 379/106.02; 600/300
(58) Field of Classification Search .................. 379/38, 379/39–45, 106.02; 600/300; 128/920
See application file for complete search history.

(56) References Cited

U.S. PATENT DOCUMENTS

| | | | | |
|---|---|---|---|---|
| 5,797,839 A | * | 8/1998 | Herscu | 600/300 |
| 5,933,080 A | | 8/1999 | Nojima | 340/539 |
| 6,053,864 A | * | 4/2000 | Clawson | 600/300 |
| 6,283,761 B1 | * | 9/2001 | Joao | 434/236 |
| 6,671,351 B2 | * | 12/2003 | Menard et al. | 379/45 |

FOREIGN PATENT DOCUMENTS

| | | |
|---|---|---|
| JP | 10-162284 | 6/1998 |
| JP | 2000-107160 | * 4/2000 |
| JP | 2000-222499 | * 8/2000 |
| JP | 2000-299751 | 10/2000 |

* cited by examiner

*Primary Examiner*—Melur Ramakrishnaiah
(74) *Attorney, Agent, or Firm*—Staas & Halsey LLP (57) ABSTRACT

The medical condition information storage unit contains the information related to the predetermined medical condition and the symptoms of the medical condition. The contact information storage unit contains the contact information related to the level of urgency. The screen configuration data storage unit contains the information related to the patient's communication device based on the level of urgency. The symptoms of a particular medical condition and the measures to cope with the symptoms are selected based on the level of urgency of the patient's medical condition. Accordingly, the screen configuration data of the patient's communication device is generated.

9 Claims, 10 Drawing Sheets

FIG.3

CONTACT INFORMATION DATABASE

| No | USER No. | CONTACT NAME | CONTACT INFORMATION 1 | ... | LEVEL OF URGENCY |
|---|---|---|---|---|---|
| 1 | 1001 | RESIDENCE | 044-000-***** | ... | A |
|  |  | FAMILY DOCTOR | 044-444-***** | ... | B |
|  |  | POLYCLINIC | 044-222-***** | ... | C |
| 2 | 1002 | RESIDENCE | 045-000-***** | ... | A |
| ... | ... | ... | ... | ... | ... |

FIG.4

DIAGNOSIS INFORMATION DATABASE

| No | USER No. | SEX | NAME | DATE OF BIRTH | ADDRESS 1 | CONTACT INFORMATION 1 | MEDICAL CONDITION |
|---|---|---|---|---|---|---|---|
| 1 | 1001 | MALE | TARO KINKYU | 19620201 | △△ X-CHO ○-KU KAWASAKI-SHI | 044-000-**** | ANGINA,... |
| 2 | 1002 | FEMALE | HANAKO KINKYU | 19341011 | ×× ○-CHO □-KU KAWASAKI-SHI | 043-111-**** | MYOCARDIAL INFARCTION,... |
| ... | ... | ... | ... | ... | ... | ... | ... |

| MEDICAL ATTENDANT | INSTITUTION | ADDRESS 2 | CONTACT INFORMATION 2 |
|---|---|---|---|
| KAWASAKI | ○○POLYCLINIC | ○○-○ X-CHO ○-KU KAWASAKI-SHI | 044-222-**** |
| SUSUKIDA | △△UNIVERSITY HOSPITAL | △△-△ ○-CHO □-KU KAWASAKI-SHI | 044-333-**** |
| ... | ... | ... | ... |

FIG.5

SCREEN CONFIGURATION DATABASE

| No | LEVEL OF URGENCY | FONT SIZE | FONT SIZE INFORMATION | FONT COLOR | FONT COLOR INFORMATION | BUTTON INFORMATION | BUTTON | FLASH LEVEL | ALARM | ... |
|---|---|---|---|---|---|---|---|---|---|---|
| 1 | A | STANDARD | font size=2 | BLACK | font color="#000000" | accesskey="1" | 1 | WEAK | LOW | ... |
| 2 | B | MEDIUM | font size=3 | GREEN | font color="#0000FF" | accesskey="2" | 2 | MEDIUM | MEDIUM | ... |
| 3 | C | LARGE | font size=4 | RED | font color="#FF0000" | accesskey="3" | 3 | STRONG | LOUD | ... |
| ... | ... | ... | ... | ... | ... | ... | ... | ... | ... | ... |

FIG.6

MEDICAL CONDITION DATABASE

| No | MEDICAL CONDITION | SYMPTOMS | REMEDIAL MEASURE | MESSAGE DATA | LEVEL OF URGENCY |
|---|---|---|---|---|---|
| 1 | ANGINA | FEELING GIDDY | CALM THE PATIENT… | MAKE PATIENT REST A WHILE | A |
| | | FEELING SICK | CONTACT THE DOCTOR… | PLEASE SEND THE PATIENT TO THE RESIDENCE | B |
| | | HAVING CHEST HEAVINESS | MUST CONSULT THE DOCTOR… | PLEASE SEND FOR AN AMBULANCE… | C |
| 2 | MYOCARDIAL INFARCTION | HAVING PAIN IN THE CHEST | ASK PATIENT TO TAKE BEDREST… | MAKE PATIENT TO REST A WHILE… | A |
| | … | … | … | … | … |
| … | | | | … | … |

FIG.7

```
<html> <head> <title> A </title> </head> <body>
<div align="center"> URGENCY CONTACT </div>
<hr>
<font size=2>  <a href=tel:044754****"accesskey="1">      <font color="#000000">
[1] FEELING GIDDY </a> </font> <br>
<font size=3>  <a href=tel:033216****"accesskey="2">      <font color="#0000FF">
[2] FEELING SICK </font color>  </a> </font>  <br>
<font size=4>  <a href=tel:033735****"accesskey="3">      <font color="#FF0000">
[3] HAVING CHEST HEAVINESS </font color>
</a>  </font> <br>
<br>
<hr>
<b> PLEASE PUSH APPLICABLE NUMBER </b> <br>
<hr>
            :
</body>  </html>
```

FIG.8

SYSTEM AND PROGRAM FOR PROVIDING MEDICAL SUPPORT

This application is a continuing application, filed under 35 U.S.C. §111(a), of International Application PCT/JP02/03193, filed Mar. 29, 2002, it being further noted that foreign priority benefit is based upon Japanese Patent Application 2001-101827, filed Mar. 30, 2001.

TECHNICAL FIELD

The present invention relates to a medical support system and a medical support program that provides a communication device that operates in response to the medical condition of a patient.

BACKGROUND ART

There have been many inventions in the past relating to sending emergency signals when a person is feeling unwell. The communication device in which a button is provided next to the receiver of a telephone and the toting-type communication device such as the emergency wireless pendant hung around the neck when the person is traveling outside and the like are a few examples of such devices.

The main feature of the communication device is to convey an urgent medical situation to some specific person (contact person), such as a doctor in charge, when a button in the communication device is pressed. There are also devices that patients can carry on their person and that detects any physical abnormality by sensors through any change in the heartbeat or breathing pattern. When a sensor in this device detects any abnormality in the patient, the device sends out a beeping sound or flashing light that can be perceived by a third person located near the patient.

In the conventional communication device, there is no provision to determine the operational steps and the contact person. Hence, even if there is no actual emergency condition, the registered contact destination such the patent's home, the patent's family doctor etc. is informed of the patient's medical condition on click of a button.

Some communication devices have many buttons, each corresponding to one contact. Even in such communication devices, there is no screen configuration and design regarded for the symptom or the illness of the patient. The operation ability of the communication device is bad as the communication of the illness or the symptoms of the patient is not performed. The reason of the inefficient operation of the communication device can be attributed to the pressing of the wrong button.

In the type of communication device provided with sensors, even if the patient uses the device under normal conditions, pressure is exerted on the device based on the patient's posture and condition. This becomes a reason for conveying a wrong communication about the condition of the patient.

An object of the present invention is to provide a convenient communication device and system in which the operational contents of the communication device used by patients can be set based on the medical condition or the symptoms of the patient.

DISCLOSURE OF THE INVENTION

The medical support center is provided with a medical condition information storage unit, a contact information storage unit, a diagnosis unit, a contact information determining unit, and a screen configuration data generation unit. The medical condition information storage unit contains information related to the predetermined medical condition and the symptoms that are recorded based on the level of urgency. The contact information storage unit contains the contact related information based on the level of urgency. The diagnosis unit performs the selection of the symptom that is recorded in the medical condition information storage unit. The contact information determining unit determines the level of urgency based on the symptom which is previously selected. The contact information determining unit then determines the contact information based on the level of urgency. The screen configuration data generation unit extracts the screen configuration data based on the level of urgency of the selected symptom.

BEST MODE FOR CARRYING OUT THE INVENTION

An embodiment of the present invention is explained next with reference to the accompanying drawings.

Figure 1:
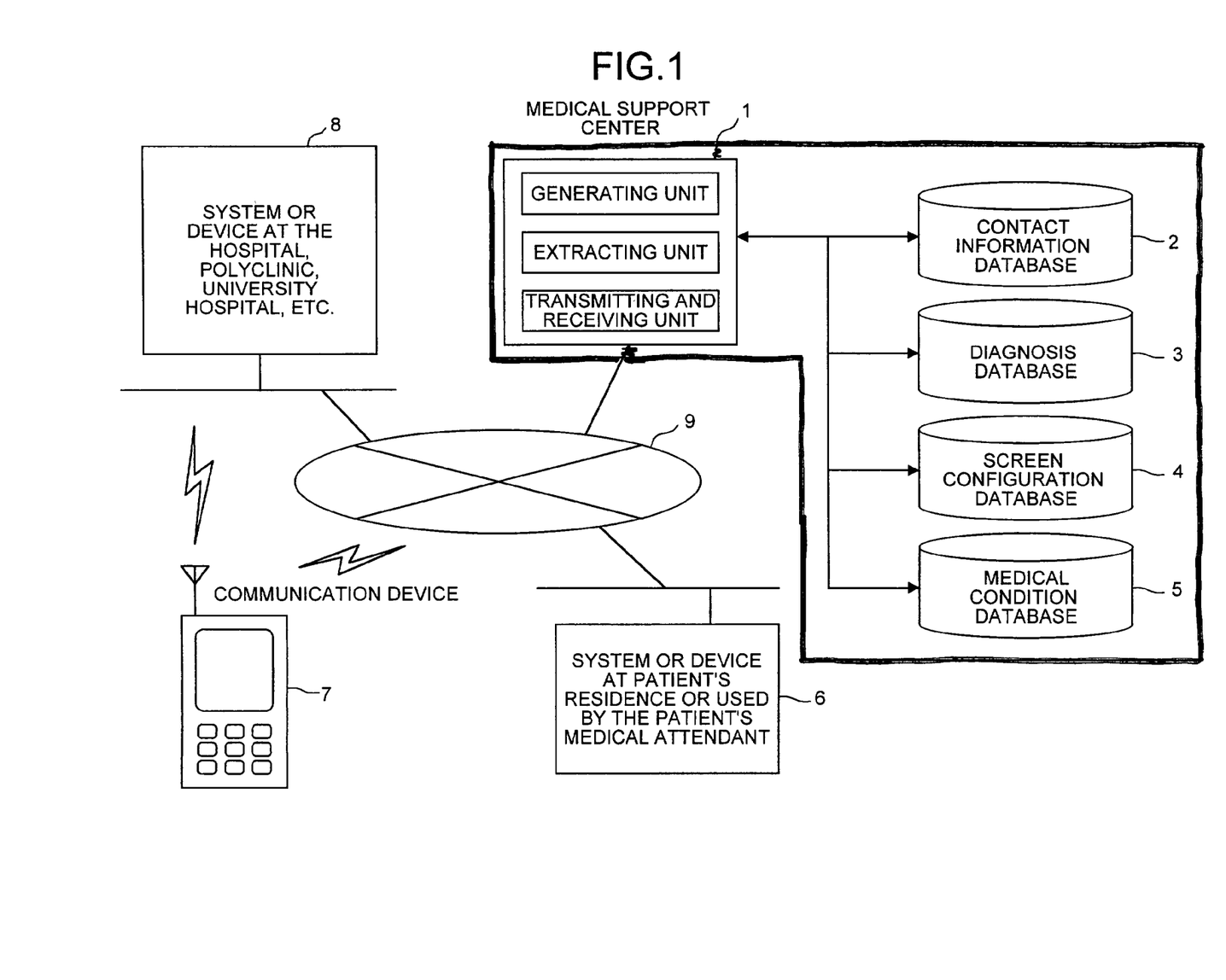
FIG. 1 is a block diagram of an embodiment of the medical support system.

FIG. 1 is a block diagram of the system according to an embodiment of the present invention. The medical support system 1 is connected to a system or device 6 and a system or device 8 through a network 9. The system or device 6 is located at the patient's residence or used by the patient's medical attendant. The system or device 8 is located at a hospital, a polyclinic, a university hospital and the like. The patient's contact information and diagnosis related information are input to the system or device 8.

The medical support system 1 extracts information about the patient based on the inputs made to the system or device 8. The information is extracted based on the symptoms of the patient, appropriate remedial measure for the symptoms, message, and the level of urgency of the symptom of the patient. The medical support system 1 generates the configured screen information of a communication device 7 that is used by the patient. The medical support system 1 also generates the contact person information based on the level of urgency. The medical support system 1 then transfers the generated information to the communication device 7 through a network 9.

The communication device 7 receives the screen configuration data from the medical support center 1 and displays the information related to the medical condition of the patient on a screen. In addition, the communication device 7 transmits the patient's symptoms when the patent operates a button assigned for a specific symptom. The information related to a specific symptom is transmitted from the communication device 7 to the contact destination such as the patient's residence, family doctor, and the like.

The network 9 may be the Internet or the like. The network 9 is the medium through which data exchange can be performed.

The medical support center 1 comprises of a transmitting and receiving unit, an extracting unit, a generating unit, a contract information database 2, a diagnosis database 3, a screen configuration data information database 4, and a medical condition database 5. It will be assumed here that the databases are part of the medical support center 1, nevertheless, the databases may be provided outside the medical support center 1.

The contact information database 2 stores the corresponding information of the user number, contact, contact information, level of urgency and other related data.

The diagnosis database 3 stores the corresponding information of the user number, gender, user name, data of birth, address, contact information, medical condition, medical attendant, institution, and other related data.

The screen configuration database 4 stores the corresponding information of the degree of urgency, font size, font size information, font color, font color information, button information, button, flash level, alarm, and other related data. The screen configuration database 4 contains the information related to the patient's communication device based on the level of urgency.

The medical condition database 5 stores the corresponding information of the medical condition, symptoms, remedial measures, message information, degree of urgency, and other related data.

The communication device 7 also enables input of information according to the screen configuration data received from the medical support system 1.

It will be assumed here that the screen configuration data is created by the medical support center 1 based on the information input to the system or device 8 at the hospital. However, the screen configuration data may also be created by providing the infrastructure available at the medical support center 1 to the system or device at the hospital, the patient's residence, or the medical attendant. The screen configuration data generated is transmitted to the patient's communication device 7.

The method of receiving the contact information and diagnosis of the patient by the medical support center 1 is explained next. The screen configuration data of the communication device 7 corresponding to the symptom of the patient is created based on the information received by the medical support center 1. The created screen configuration data is then transmitted to the communication device 7. The process of generating the screen configuration data is explained next.

Figure 2:
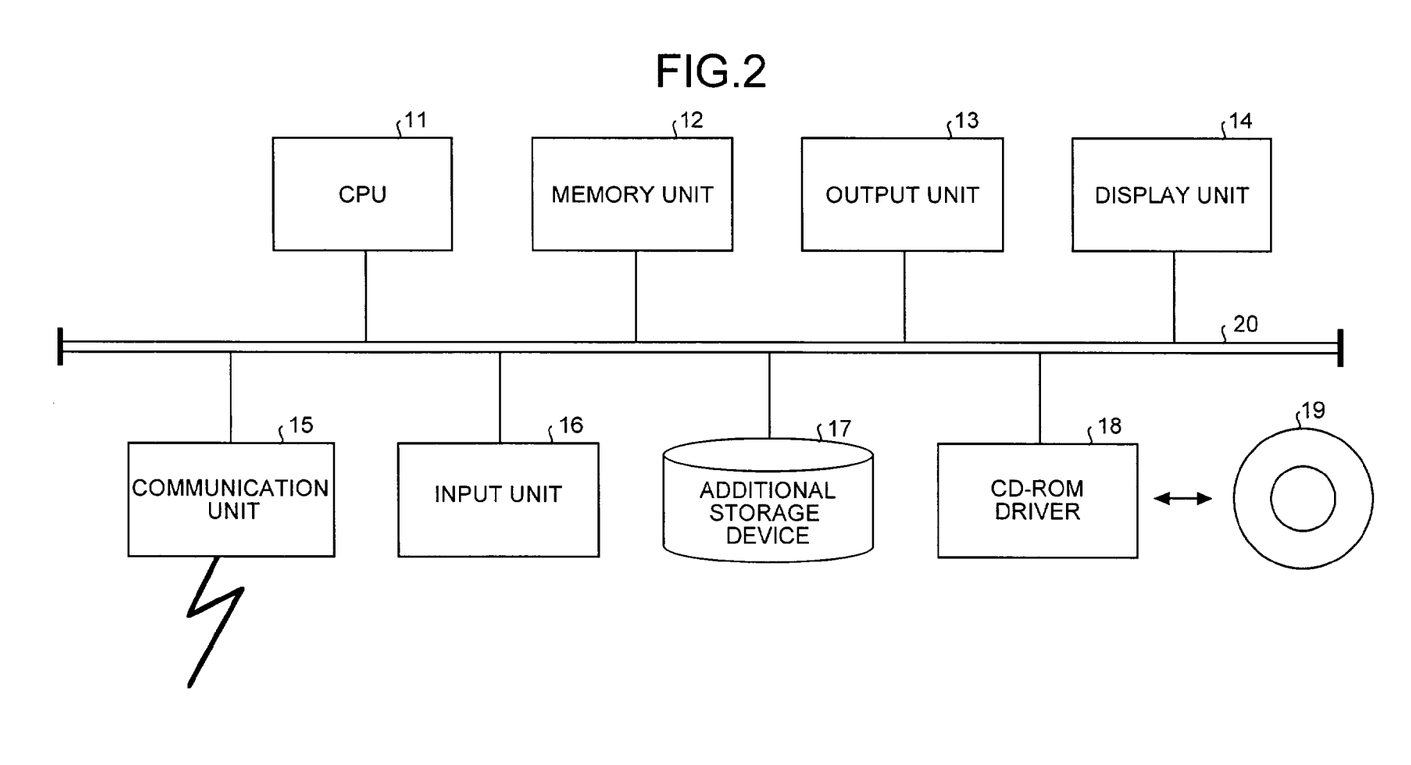
FIG. 2 is a block diagram of the hardware configuration of the medical support center.

FIG. 2 shows a block diagram of the hardware configuration of the medical support center 1.

The medical support center 1 comprises of a central processing unit 11 (CPU), a memory unit 12, an output unit 13, a display unit 14, a communication unit 15, an input unit 16, an additional storage device 17, and a CD-ROM drive unit 18. Each of units of 11 to 18 is connected to the bus 20.

The CPU 11 controls the medical support system according to the program stored in the memory unit 12. The CPU 11 also creates the screen configuration data of the medical support center 1. The memory unit 12 consists of a RAM and/or a ROM. The memory unit 12 stores the program run in the CPU 11 and the data required for the operations performed by the CPU 11. A portion of the memory unit 12 is allocated as work area for the CPU 11 to carry out its operations.

The output unit 13 displays the result of the process or the specified data. The output unit 13 may be a printer or the like. The input unit 16 may be a mouse, keyboard, or the like. The input unit 16 is used to input various kinds of information by the administrator of the medical support center 1 to generate the screen configuration data. The screen configuration data of the communication device 7 is generated based on the patient's medical condition. The display unit 14 displays various kinds of data required by the administrator based on the operation of the CPU 11. The communication unit 15 transmits the screen configuration data of the patient's communication device 7 that is generated based on the input patient information.

The additional storage device 17 may be a hard disk. The additional storage device 17 may also be used for storing the contact information database 2, diagnosis database 3, screen configuration database 4, medical condition database 5, and the program required for running the medical support system.

The program required for running the medical support system can be accessed from the CD-ROM 19. When the CD-ROM 19 having the program is placed in the CD-ROM drive unit 18, the program is read and installed in the additional storage device 17 through the bus 20. When the process related to the medical support system is started, the CPU 11 initiates the process based on the program stored in the additional storage device 17. The storage medium of all the programs is not restricted only to the CD-ROM 19. For example, any computer readable medium from where the program can be received by the communication unit 15 and stored in the additional storage device 17 can be used instead of the CD-ROM 19.

The database structures of contact information database 2, diagnosis database 3, screen configuration data database 4, and medical condition,database 5 are explained next.

Figure 3:
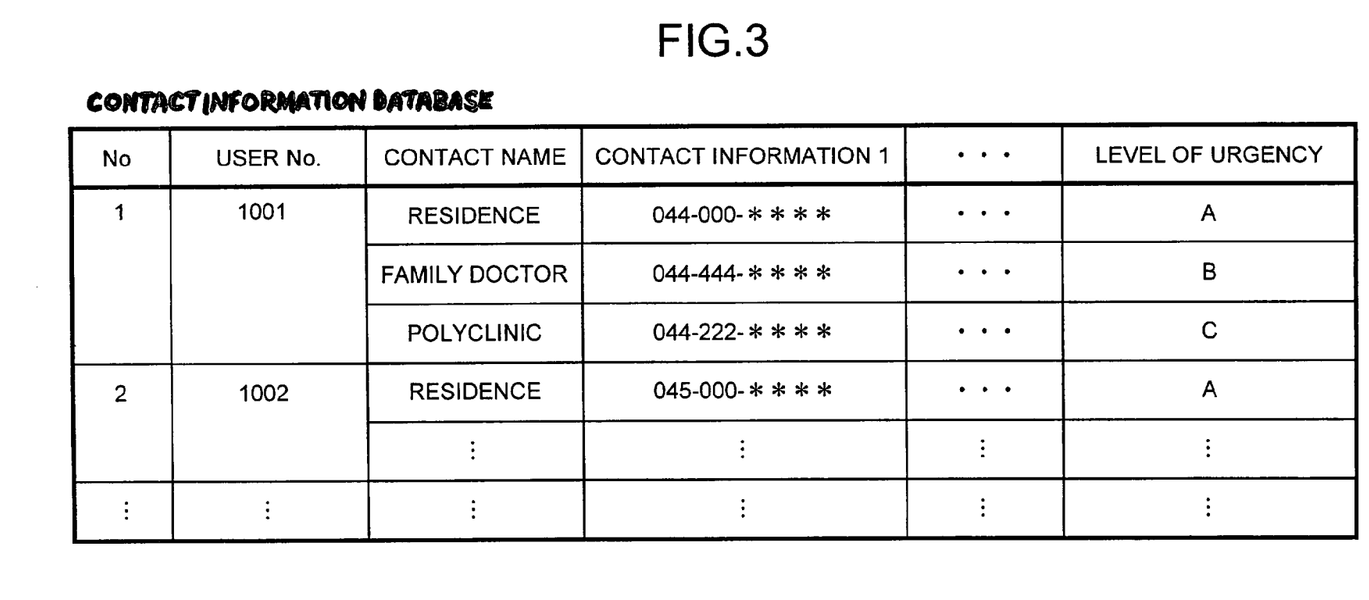
FIG. 3 shows sample records of contact information database.

FIG. 3 shows sample records of the contact information database 2. The contact information database 2 has fields such as record number, user number, contact person, contact number, the level of urgency, and the like. The level of urgency corresponds to the condition of the patient. For instance, if the patent's medical condition is mild and requires only a simple intimation, the patient's residential telephone number is recorded in the database. On the other hand, if the medical condition is serious and requires immediate examination by the doctor, the telephone number of a medical attendant or a hospital is recorded in the database.

Figure 4:
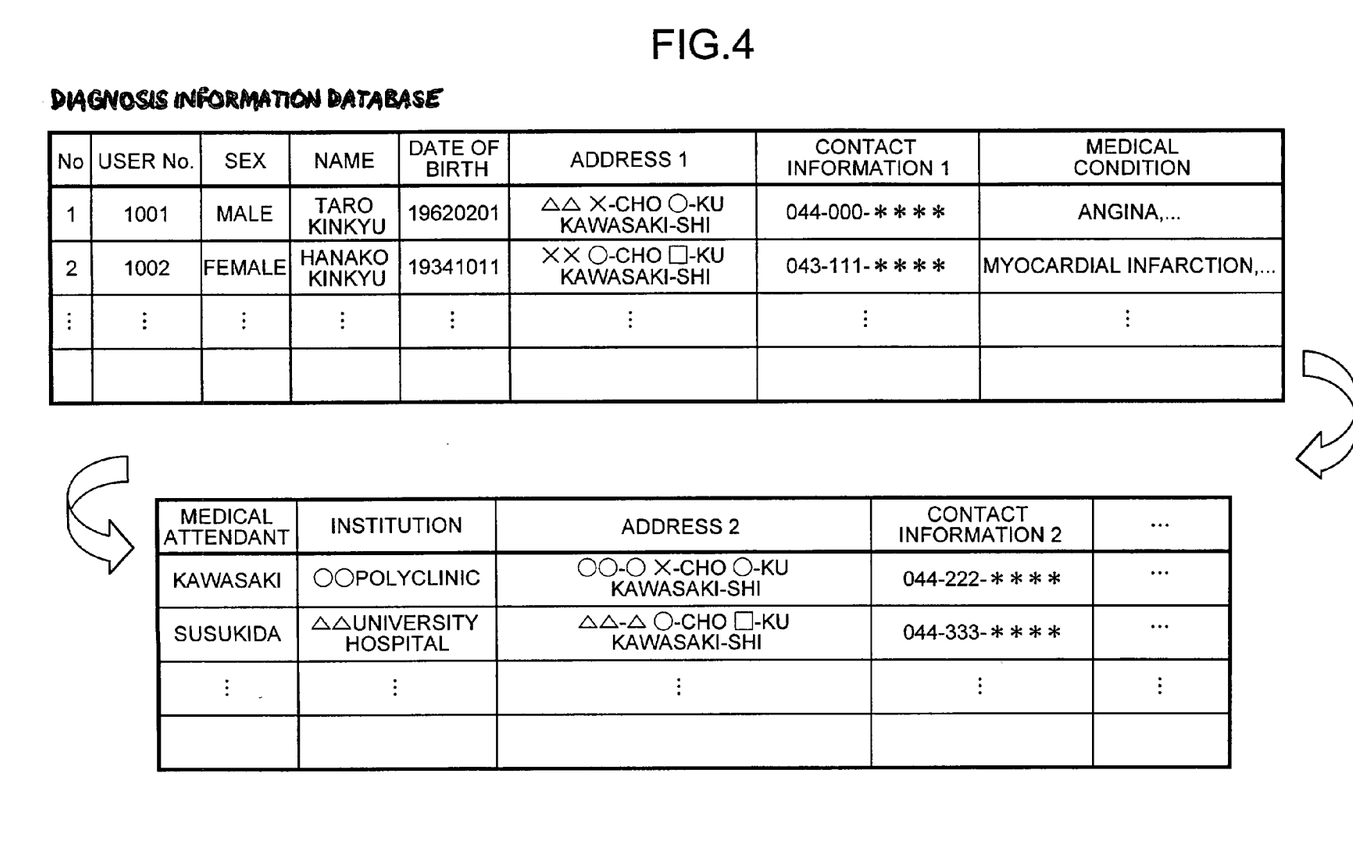
FIG. 4 shows sample records of the diagnosis result information database.

FIG. 4 shows sample records of the diagnosis database 3. The diagnosis database 3 has fields such as record number, gender of the patient, name of the patient, date of birth of the patient, address of the patient, contact telephone number, medical condition, name of the medical attendant, name of the hospital, address and telephone number of the hospital, and the like.

The medical condition field, for instance, may have information related to the medical condition of the patient diagnosed by the medical attendant.

Figure 5:
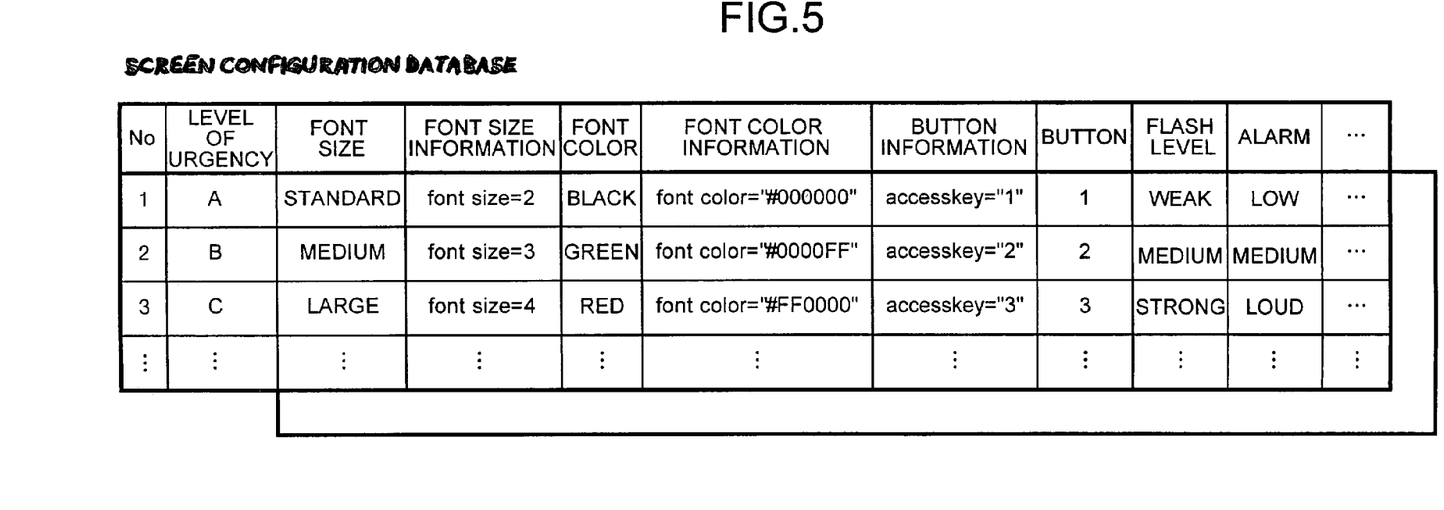
FIG. 5 shows sample records of screen configuration database.

FIG. 5 shows sample records of the screen configuration database 4. The screen configuration database 4 has fields such as record number, level of urgency, font size in the patient's communication device, the font size information, font color, font color information, button information, button, flash level, alarm, and the like.

Figure 6:
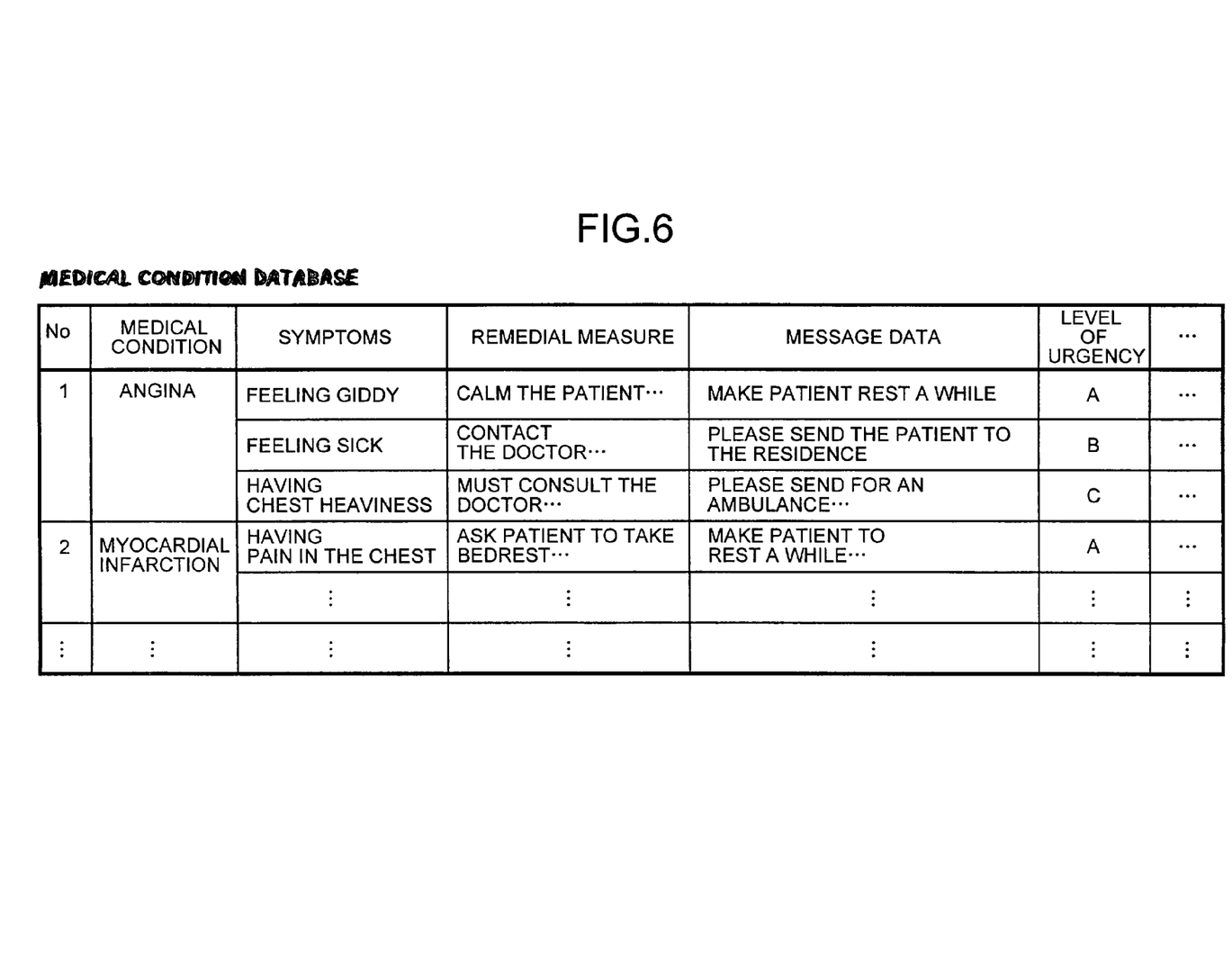
FIG. 6 shows sample records of medical condition database.

FIG. 6 shows sample records of the medical condition database 5. The medical condition database 5 has fields such as record number, medical condition, symptom, remedial measure, message, level of urgency, and the like.

For example, if the medical condition is angina, its corresponding symptom in the symptom field is feeling giddy. The remedial measure corresponding to the symptom is to calm the patient and the corresponding message is to make patient rest a while. In cases of relatively mild symptoms, a low level of urgency A is assigned.

Figure 7:
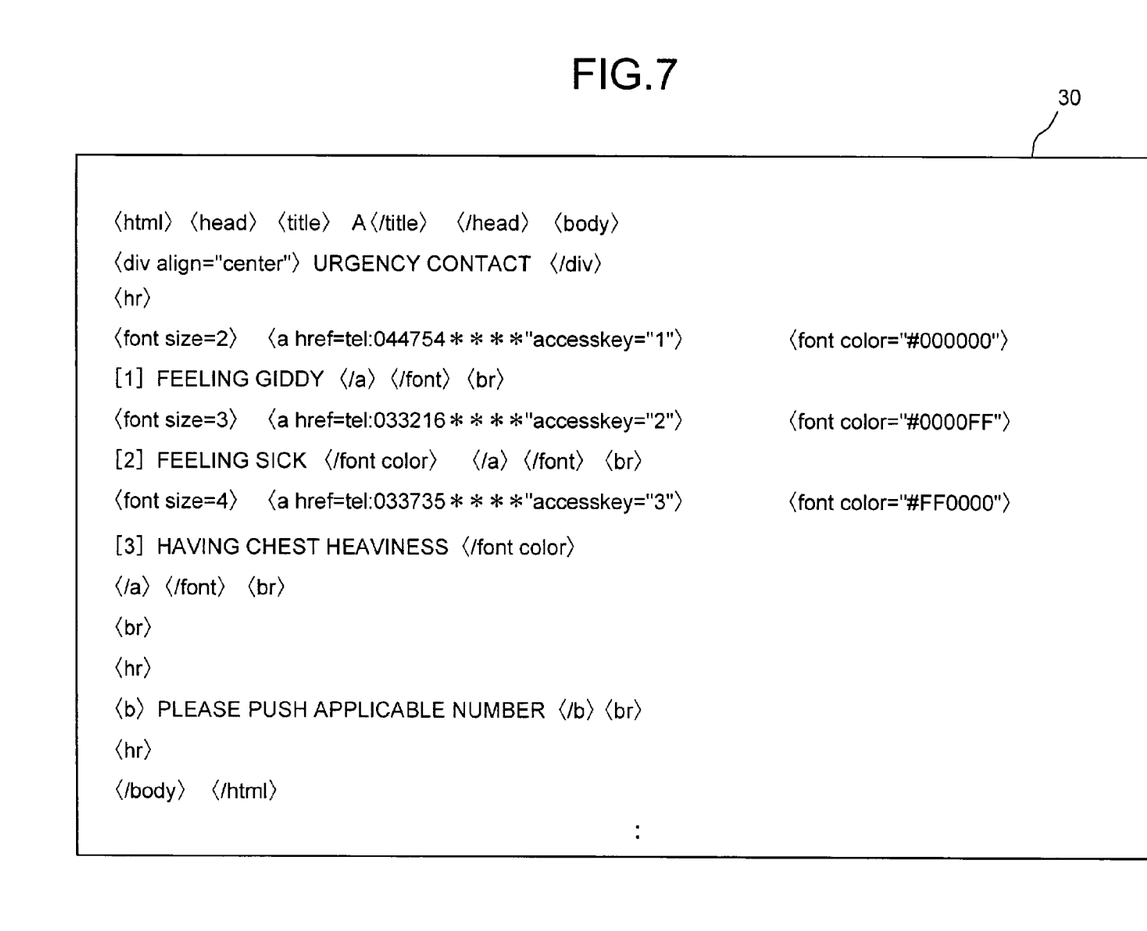
FIG. 7 is an example of the information of a sample screen.

FIG. 7 is a sample data of a configuration screen that is created based on the symptoms of the patient. As shown in FIG. 7, the screen configuration data 30 is written in Hyper Text Markup Language (HTML). Each data is delimited by an opening tag and a closing tag. For example, the opening and closing tag for specifying font size of 2 is <font size=2> and </font> respectively. The opening and closing tag for linking one data with another, for instance linking telephone number 044754** with button 1 is <a href=tel:044754**accesskey:1> and </a> respectively. For example, the opening and closing tag for black font color is <font color=#000000> and </font> respectively.

Figure 8:
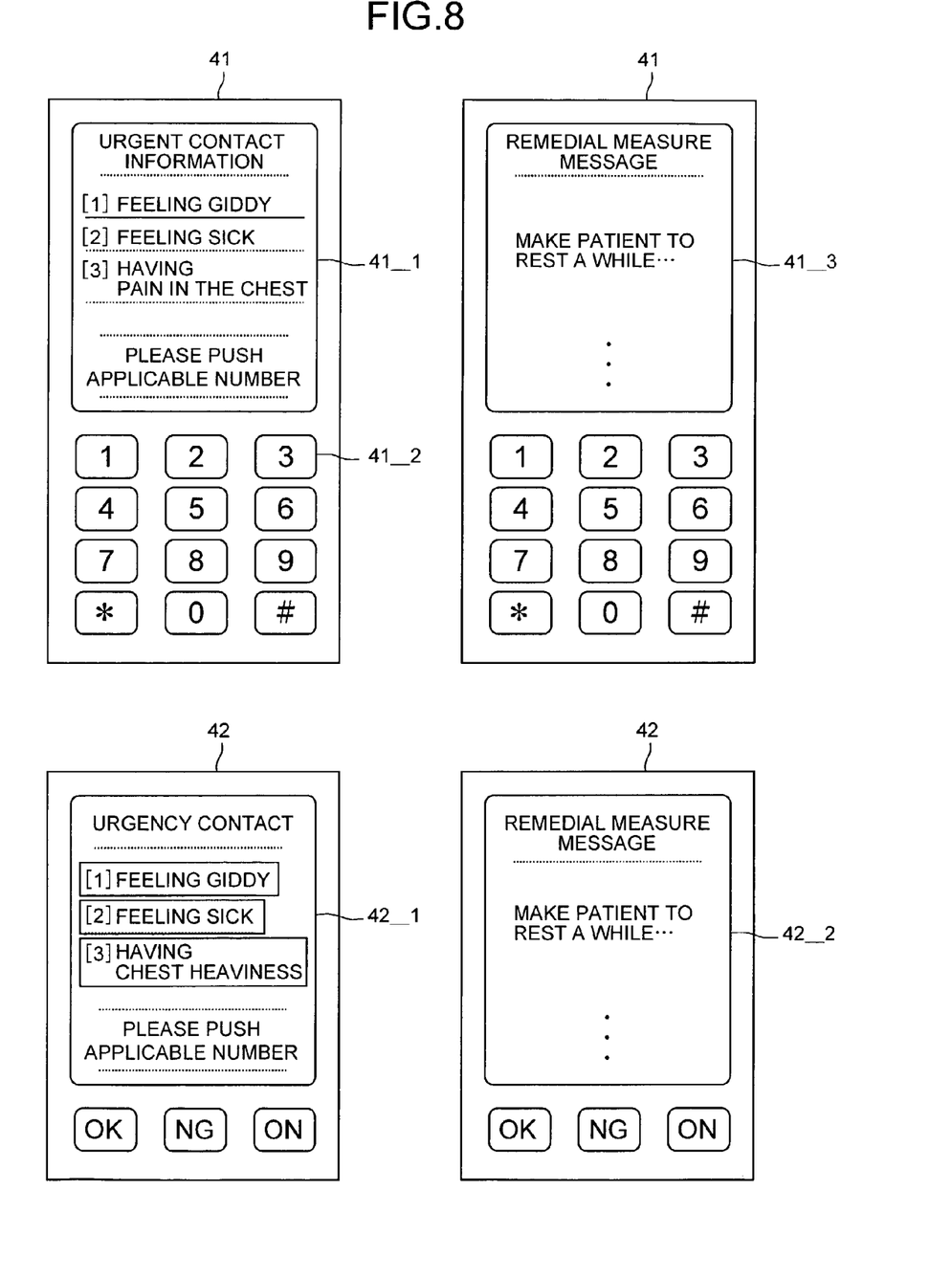
FIG. 8 shows the various screens of the communication device.

FIG. 8 shows the screens, 41_1 and 41_3 of a communication device 41 with the screen configuration data shown in FIG. 7.

The communication device 41 receives the screen configuration data transmitted from the medical support center 1. As shown in FIG. 8, buttons are displayed in the screen 41_1 of the communication device 41, making it possible to associate the symptom of the patient according to the diagnosed result. The buttons 41_2 are displayed on the screen 41_1 based on the screen configuration data received from the medical support center 1. The buttons 41_2 correspond to the buttons in the button group 41_2 on the screen 41_1. Each button in the button group 41_2 is linked to the corresponding button in the button group on the screen 41_1. By pressing a button corresponding to a symptom in the button group 41_2, the information is send to the contact person dealing with that particular symptom.

The communication device 42 in FIG. 8 showing screens 42_1 and 42_2 is an example of another embodiment of the present invention. The screens 42_1 and 42_2 are displayed based on the seriousness of the medical condition of the patient. The communication device 42 receives the screen configuration data transmitted from the medical support center 1. The screens 42_1 and 42_2 display buttons for appropriate input operations based on the screen configuration data. The buttons are also made to appear distinctive depending on the seriousness of the medical condition of the patient. This distinction is achieved by varying the size of button, color of the button, the area of the button, or a shape of the button. The duration of the flash signal or the alarm sound is also varied depending on the seriousness of the medical condition.

Figure 9:
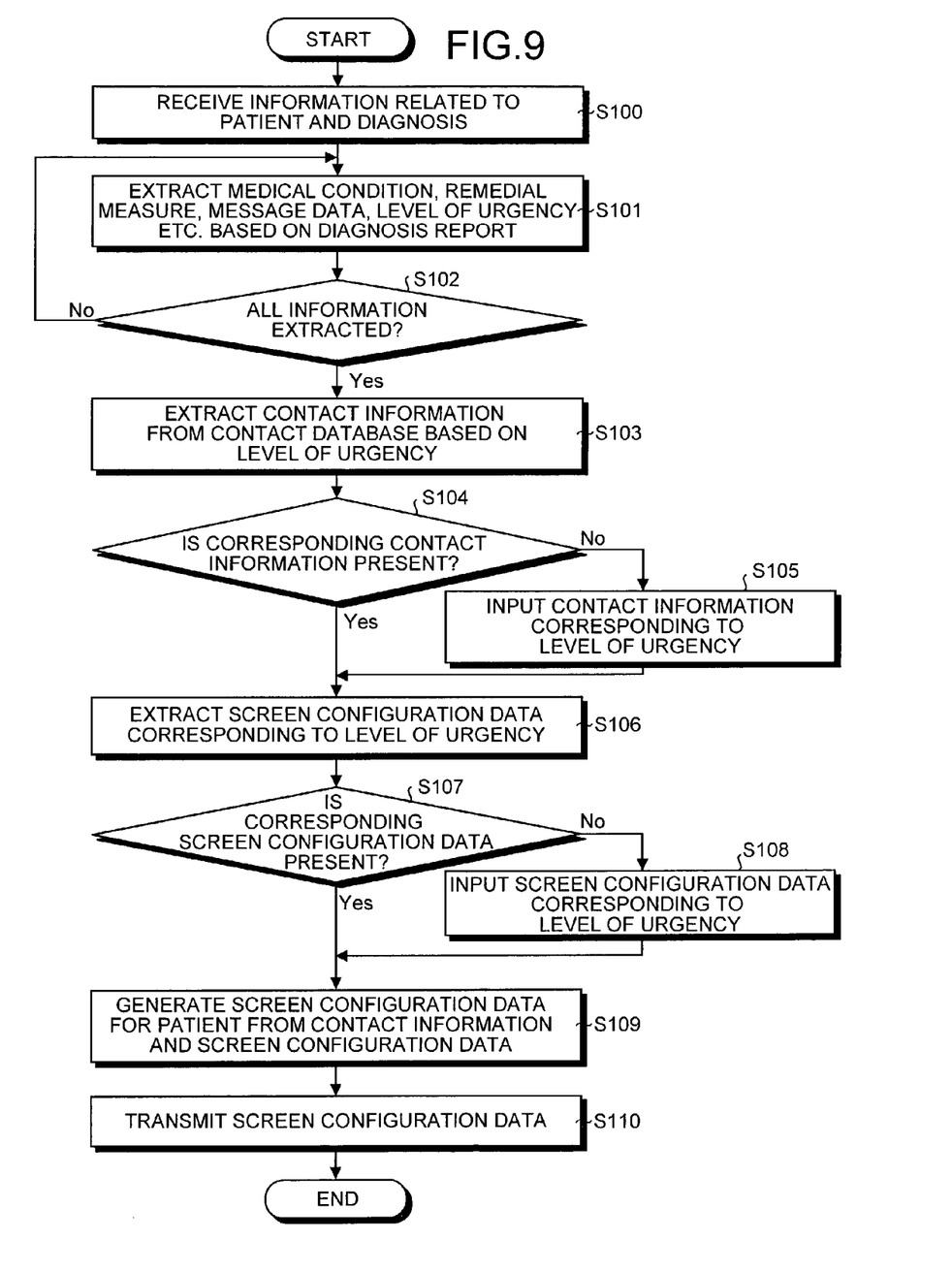
FIG. 9 is a flowchart that shows the generation process of the configuration screens of the medical support system.
Figure 10:
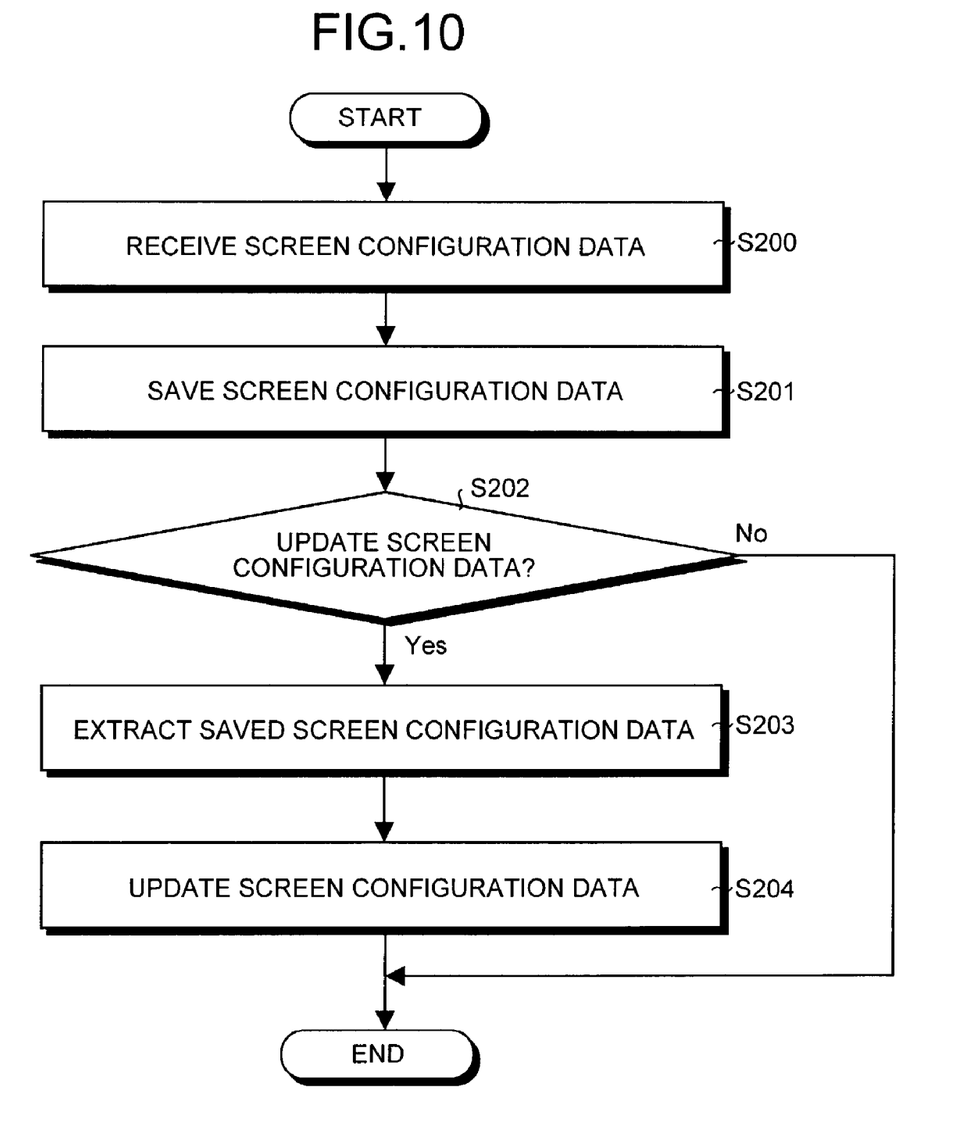
FIG. 10 is a flowchart that shows the process of display of the screen configuration data on the screen of the communication device.

FIG. 9 is the flowchart showing the process of generation of the screen configuration data in the medical support system 1. The process explained in FIG. 9 is related to the operations of the communication device 7 based on the level of urgency of the symptom of the patient. FIG. 10 is the flowchart showing the operations of the communication device 7. FIG. 10 shows the process of display of the screen configuration data on the screen of the communication device 7.

In step S100, the receiving unit of the medical support system 1 receives the information related to the patient and the examination report of the patient. The information received is stored in the contact information database 2 and the diagnosis database 3.

In step S101, the extracting unit of the medical support system 1 extracts the information related to the symptom of the patient, remedial measure, message, and level of urgency of the symptom from medical condition database 5. The extracting unit extracts the information based on the diagnosis report received by the receiving unit.

In step S102, it is decided whether all the information related to the patient's condition is extracted. When all the information has been extracted, as indicated by Yes, the process proceeds to S103. When all the information is not extracted, as indicated by No, the process returns to S101 and the steps S100 to S102 are repeated.

In step S103, the contact information is extracted from the contact database based on the level of urgency of the symptom of the patient.

In step S104, it is decided whether the contact information corresponding to the level of urgency is saved. If the contact information has not been saved, as indicated by No, the process proceeds to step S105. If the contact information has been saved, as indicated by Yes, the process proceeds to step S106.

In step S105, the input of contact information and the contact corresponding to the level of urgency is accepted and stored in the contact information database 2.

In step S106, the screen configuration data corresponding to the level of urgency is extracted from the screen configuration database 4.

In step S107, it is decided whether the screen configuration data that corresponds to the level of urgency is saved. If the screen configuration data has not been saved, as indicated by No, the process proceeds to step S108. If the screen configuration data has been saved, as indicated by Yes, the process proceeds to step S109.

In step S108, the input of data related to screen configuration data corresponding to the level of urgency is accepted, and stored in the screen configuration database 4.

In step S109, the generating unit of the medical support center 1 generates the screen configuration data in correspondence with the level of urgency of the patient's symptoms. The generating unit generates the screen configuration data based on the information regarding the patient's condition extracted in step S101.

In step S110, the transmitting unit of the medical support center 1 transmits the screen configuration data generated by the generating unit of the medical support center 1.

FIG. 10 is a flowchart that shows the process of display of the screen configuration data on the screen of the communication device 7. The process depicted in the flowchart of FIG. 10 is explained next.

In step S200, a receiving unit of the communication device 7 receives the screen configuration data.

In step S201, a storage unit of the communication device 7 stores the received screen configuration data.

In step S202, an updating unit of the communication device 7 decides whether the received screen configuration data has to be updated. If the updation is not to be performed, as indicated by No, the process is terminated. If the updation is to be performed, as indicated by Yes, the process proceeds to step S203.

In step S203, an extracting unit of the communication device 7 extracts the screen configuration data that is stored in the storage unit of the communication device 7.

In step S204, an updating unit of the communication device 7 updates the screen configuration data that is extracted by the extracting unit of the communication device 7.

The processes explained in the flowcharts of FIGS. 9 and 10 can be realized with the configuration explained in FIG. 1.

According to the present invention, it is possible to easily set the operation of the communication device in correspondence with the level of urgency of the patient's medical condition. It is also possible to provide a convenient medical support system based on the patient's medical condition.

Further, the medical support system performs the appropriate kind of communication based on the level of urgency of the patient's symptom. A configuration is provided to set the contact information corresponding to a symptom. The set contact information is thereby communicated to the patient The message of coping with the symptom and the medical condition of the patient is visually displayed on the communication device held by the patient. Hence it is possible to notify the patient or a third person located near the patient about the assistance to be administered to the patient. In this manner, it is possible to speedily give medical attention to the patient, particularly when an urgent medical situation occurs.

A configuration of correlating the symptom related information and the buttons that appear on the patient's communication device is provided. Hence, it is possible to eliminate any mistaken operation of the patient by pushing the wrong button. It is also possible to assuage any mental block of the patient towards the usage of the communication device and also reduce the complexity in the operation of the device.

INDUSTRIAL APPLICABILITY

The present invention is related to a medical support system and program provides a communication device operated according to the symptoms of a patient.

The invention claimed is:

1. A medical support system comprising:
a medical condition information storage unit that stores information related to a predetermined medical condition and symptoms specific to the medical condition in correspondence with a level of urgency;
a contact information storage unit that stores contact information in correspondence with the level of urgency;
a selecting unit that is used to select a symptom of a patient from the symptoms stored in the medical condition information storage unit; and
a contact information determining unit that determines the level of urgency of the patient based on the symptom selected using the selecting unit and extracts the contact information stored in the medical condition information storage unit based on the determined level of urgency.

2. The medical support system according to claim 1, wherein screen configuration data is created so that the level of urgency or the symptoms is recognized visually.

3. The medical support system according to claim 1, wherein it is possible to display screen configuration data that is created based on the level of urgency of the symptom or the symptom of the patient.

4. A medical support program that makes a computer function as:
a medical condition data storage unit that stores information of a medical condition and symptoms specific to the medical condition in correspondence with a level of urgency;
a screen configuration data storage unit that stores screen configuration data generated in correspondence with the level of urgency;
a screen configuration data generation unit that extracts symptoms of a patient based on input information and creates the screen configuration data in correspondence with the level of urgency of the extracted symptom; and
a transmitting unit that transmits the screen configuration data created by the screen configuration data generation unit, to a communication device used by the patient.

5. A method for providing medical support to a patient, comprising:
storing information related to a predetermined medical condition, symptoms specific to the medical condition, and a remedial measure for the symptoms in correspondence with a level of urgency;
selecting a symptom of the patient based on information input about the patient;
determining a level of urgency of the patient based on the selected symptom; and
extracting contact information based on the determined level of urgency.

6. A computer-readable recording medium that stores a medical support program that enables a computer to perform the functions of:
storing information of predetermined medical condition, symptoms specific to the medical condition, and the remedial measure for the symptoms in correspondence with the level of urgency;
extracting the symptom of a patient based on the information input about the patient and creating a screen configuration data corresponding to the level of urgency of the symptom extracted; and
transmitting the screen configuration data to a communication device used by the patient.

7. A medical support system comprising:
a medical condition information storage unit that stores information related to a predetermined medical condition and the symptoms for specific medical conditions in correspondence with a level of urgency;
a contact information storage unit that stores contact information in correspondence with the level of urgency;
a selecting unit that is used to select at least one symptom of a patient from the symptoms stored in the medical condition data storage unit;
a contact information determining unit that determines a level of urgency based on the symptom selected using the selecting unit and extracts the contact information stored in the medical condition information storage unit based on the determined level of urgency;
a screen configuration storage unit that stores a screen configuration in correspondence with each level of urgency; and
a screen configuration extracting unit that extracts a screen configuration from the screen configurations stored in the screen configuration storage unit based on the level of urgency determined by the contact information determining unit.

8. The medical support system according to claim 7, wherein the screen configurations are created based on the level of urgency so that the symptom of the patient or the level of urgency can be recognized visually by a user.

9. The medical support system according to claim 7, wherein the screen configurations are created based on level of urgency so that the symptom of the patient or the level of urgency can be recognized visually by a user.

* * * * *